Figure 1:
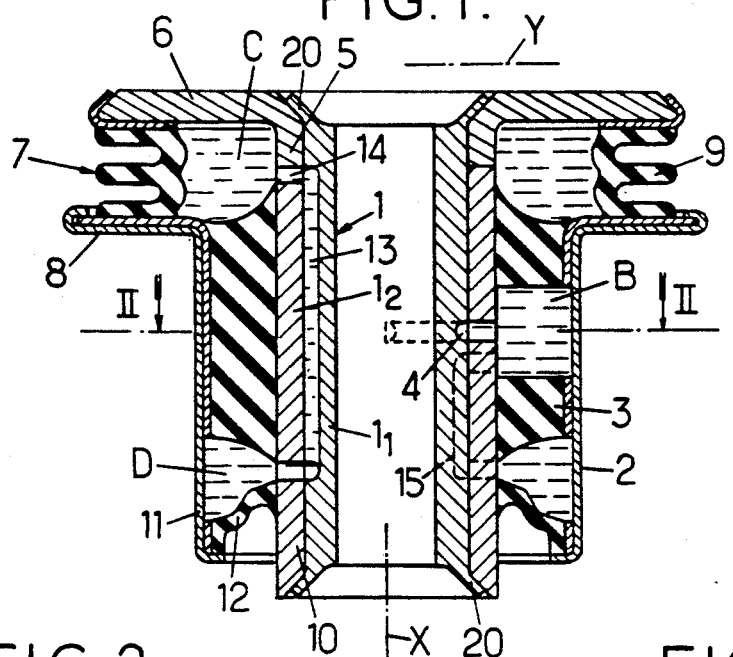

United States Patent [19]
Bouhier et al.

[11] Patent Number: 5,172,893
[45] Date of Patent: Dec. 22, 1992

[54] HYDRAULIC ANTIVIBRATORY SLEEVES

[75] Inventors: Bernard Bouhier, Vierzon; Michel Domer, Valdampierre, both of France

[73] Assignee: Hutchison, France

[21] Appl. No.: 669,885

[22] Filed: Mar. 14, 1991

[30] Foreign Application Priority Data

Mar. 16, 1990 [FR] France ............................... 90 03416

[51] Int. Cl.⁵ ............................................. F16F 13/00
[52] U.S. Cl. .............................. 267/140.12; 180/312; 248/562; 248/636; 267/219; 267/140.11; 267/140.13
[58] Field of Search ............... 267/140.1 R, 140.1 C, 267/140.1 A, 219; 180/300, 312, 902; 248/562, 636

[56] References Cited

U.S. PATENT DOCUMENTS

| | | |
|---|---|---|
| 4,721,291 | 1/1988 | Makibayashi et al. ...... 267/140.1 A |
| 4,763,884 | 8/1988 | Matsui et al. ............... 267/140.1 C |
| 4,840,357 | 6/1989 | Jouade ........................ 267/140.1 C |

FOREIGN PATENT DOCUMENTS

| | | |
|---|---|---|
| 71698 | 2/1983 | European Pat. Off. ..... 267/140.1 C |
| 37349 | 2/1984 | Japan .......................... 267/140.1 C |
| 266240 | 1/1988 | Japan .......................... 267/140.1 C |

Primary Examiner—George E. A. Halvosa
Attorney, Agent, or Firm—Larson and Taylor

[57] ABSTRACT

A hydraulic antivibratory sleeve comprises, on the the one hand, two rigid tubular frames (1, 2) with an axis X, one surrounding the other, joined together by an elastomer body (3) shaped so as to form therewith at least two sealed pockets (A, B) diametrically opposite in a direction Y perpendicular to axis X and communicating together through an narrow channel (4). The assembly formed by these pockets and the channel is filled with liquid. The sleeve includes, on the other hand, at one of its axial ends, an annular work-chamber (C) defined partially by a resilient wall (7) resisting axial compression. This sleeve further comprises at its other axial end an annular compensation chamber (D) defined partially by a flexible membrane (12), a narrow channel (13) connecting the two annular chambers directly together and the assembly formed by the channel and the two chambers being filled with liquid.

6 Claims, 2 Drawing Sheets

HYDRAULIC ANTIVIBRATORY SLEEVES

The invention relates to hydraulic antivibratory sleeves comprising two rigid tubular frames, one surrounding the other, preferably of revolution at least partially about an axis X, which frames are coaxial and concentric at least under load, are joined together by an elastomer body shaped so as to form therewith at least two sealed pockets diametrically opposite in a direction Y and communicating together through a narrow channel, the assembly formed by said pockets and said channel being filled with a damping liquid.

Such sleeves are intended to be fitted for connecting—even for supporting properly speaking—and damping purposes between two rigid pieces which can be made fast respectively with the two frames and are likely to undergo, with respect to each other, oscillations oriented in the diametrical direction Y, the assembly being adapted so that, for some at least of these oscillations, the liquid is driven alternately from one of the pockets to the other and conversely through the narrow channel, which creates in this liquid, for a given frequency of the oscillations depending on the dimensions of said channel, a resonance phenomenon capable of damping the transmission of such oscillations from one of the frames to the other.

Sleeves of the kind in question are for example intended to be inserted between a vehicle frame or body and the internal combustion engine or front or rear undercarriage of this vehicle.

The invention relates more particularly, among the above sleeves, to those intended to exert said damping effect between the two tubular frames, not only in the diametrical direction Y but also in the axial direction X.

For this it has already been proposed to form at the axial end of the sleeve an annular chamber defined respectively by extensions of the two tubular frames, by the intermediate elastomer body and by a resilient wall resisting axial compression and inserted axially between the above extensions and to connect this chamber to one at least of the pockets by a narrow channel, the assembly formed by this channel and this pocket being filled with the damping liquid (patent JP 59-37 349).

In this construction, the annular chamber is of the "work chamber" type, i.e. defined partially by a resiliently working wall and the same goes for the pockets of the sleeve, which has the drawback of creating interference between the two types of damping provided by the sleeve in respectively the two directions X and Y.

In other words, radial deformation of the sleeve in direction Y may cause not only transfers of damping liquid in this direction Y but also transfers of this liquid in the axial direction X, which tends to disturb the axial connection formed between the two frames whereas no relative oscillation is applied in this axial direction between these frames.

This interference effect may also be observed conversely if a purely axial deformation is applied to the device, this deformation possibly affecting its radial behaviour.

The purpose of the invention is especially to overcome this drawback by providing, independently of each other, the damping effects respectively in directions X and Y.

For this, sleeves of the kind in question in accordance with the invention further comprise an annular work-chamber of the above defined kind at one of the axial ends of the sleeve, this chamber being connected by a narrow channel to a deformable chamber and the assembly formed by these two chambers and the channel which joins them together being filled with liquid and they are characterized in that the deformable chamber is a "compensation" chamber defined partially by a bellows or flexible membrane which only opposes a negligible resistance to deformation.

In advantageous embodiments, recourse is further had to one and/or other of the following arrangements:
- the compensation chamber is an annular chamber disposed at the other axial end of the sleeve and defined respectively by the intermediate elastomer body, by extensions of the two tubular frames and by the flexible membrane which is then annular and connects the two extensions together,
- the pockets are four in number, distributed about the axis X and the diametrically opposite pockets are connected together in twos by narrow channels,
- one at least of the pockets is connected to the compensation chamber by a narrow channel,
- the internal tubular frame is formed by two tube sections fitted jointingly one in the other and the different narrow channels are formed by grooves hollowed out in one of the two juxtaposed cylindrical faces of the two tube sections, which grooves are connected at their ends to radial holes formed in the external tubular section,
- the tubular section in which the grooves are formed is the internal section,
- the compensation chamber is one of the pockets which are diametrically opposite in direction Y.

Apart from these main arrangements, the invention comprises certain other arrangements which are preferably used at the same time and which will be more explicitly discussed hereafter.

In what follows, some embodiments of the invention will be described with reference to the accompanying drawings in a way which is of course in no wise limitative.

Figure 2:
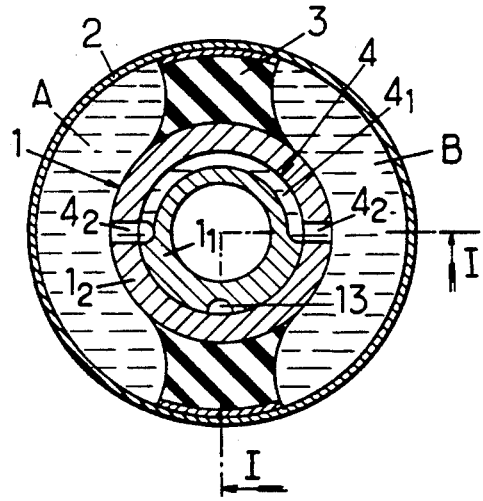
Figure 3:
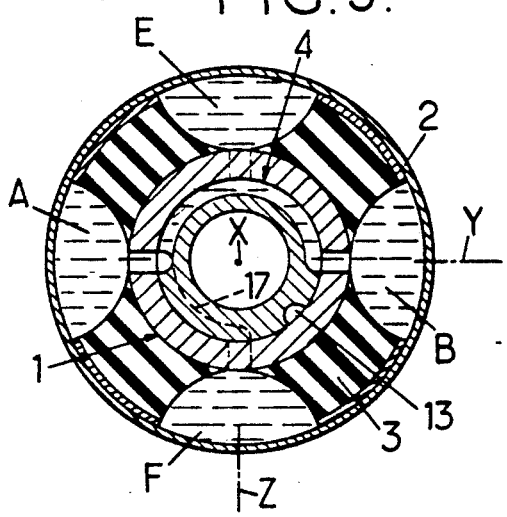
Figure 4:
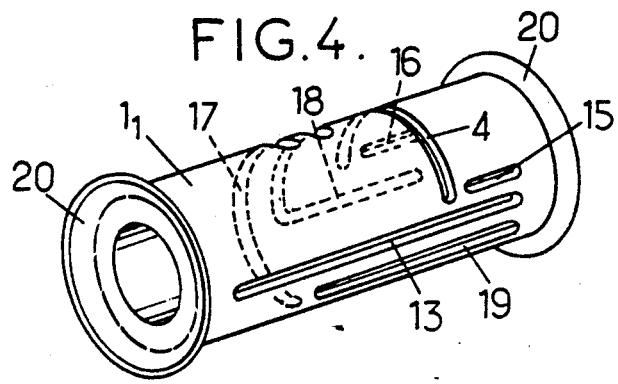
Figure 5:
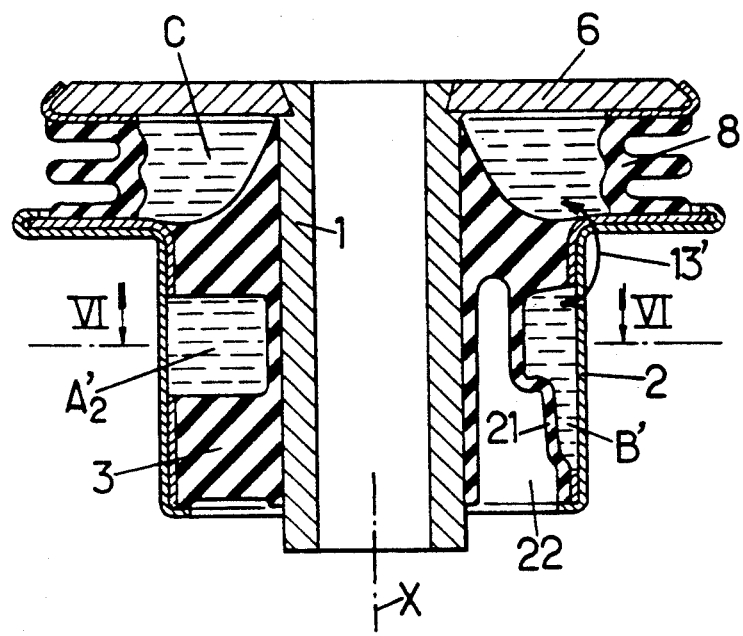
Figure 6:
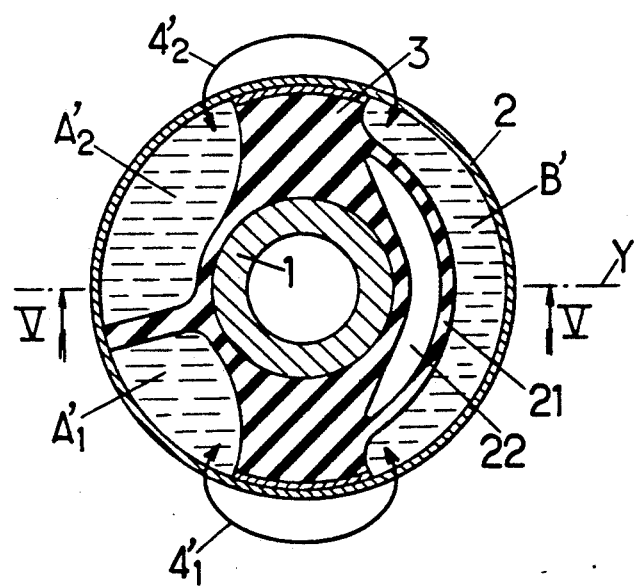

FIGS. 1 and 2 of these drawings show a hydraulic antivibratory sleeve formed according to the invention, respectively in axial section through I—I of FIG. 2 and in cross section through II—II of FIG. 1, FIG. 3 is a cross section similar to that of FIG. 2 of a hydraulic antivibratory sleeve variant also according to the invention, FIG. 4 shows in perspective one of the components of this variant, FIGS. 5 and 6 show another hydraulic antivibratory sleeve variant in accordance with the invention, respectively in axial section through V—V of FIG. 6 and in cross section through VI—VI of FIG. 5.

In each case the sleeve comprises:
- an internal tubular metal frame of revolution 1,
- an external tubular metal frame of revolution 2, which surrounds frame 1 and which, for the rest state of the sleeve, is coaxial with this frame 1, the axis X common to these two frames being oriented vertically,
- and an elastomer body 3 connecting the two frames 1 and 2 together while forming therebetween two sealed pockets A and B which are diametrically opposite in a horizontal direction Y.

The internal frame 1 is intended to be fast with a pin (not shown) which passes therethrough jointingly whereas the external frame 2 is intended to be fixed to a bearing (not shown), this pin and this bearing being firmly secured respectively to the two rigid elements between which it is desirable to fit an antivibratory support, elements such as a vehicle suspension undercarriage and the chassis or body of this vehicle.

The two pockets A and B are joined together by a narrow channel 4 and these two pockets as well as this channel are filled with a damping liquid.

In the embodiments illustrated channel 4 is formed as follows.

The internal tubular frame 1 is formed of two tube sections, one inside $1_1$ and the other outside $1_2$ fitted jointingly one in the other and channel 4 is essentially formed by a semi-cylindrical groove $4_1$ hollowed out in the external cylindrical face of the internal tubular section $1_1$, this groove being covered by the facing portion of the internal cylindrical face of the external tubular section $1_2$ and its two ends are connected to two diametrically aligned radial holes $4_2$ formed in the external tubular section $1_2$ and opening respectively into the two pockets A and B.

The internal tubular section $1_1$ is advantageously fixed in the external tubular section $1_2$ by a crimping effect, by bending the two thinned ends 20 of the internal section outwardly over the ends of the external section.

With such a sleeve, as is known, the relative oscillations applied in direction Y to one of the two tubular frames 1 and 2 result in driving the damping liquid alternately through channel 4 and, for a well-defined value of the frequency of these oscillations, which depends essentially on the dimensions of channel 4, the liquid column present in this channel is caused to resonate and the alternate movements which result therefrom prevent or at least greatly attenuate the transmission of the oscillations considered between the two frames.

It may be advantageous in some cases to obtain damping of the kind which has just been described, not only in direction Y but also in at least one other direction and in particular in the direction of the axis X.

This is for example the case when it is desired to damp the relative movements, called "galloping", applied to certain vehicle suspension under carriages, and whose paths extend in ellipses situated in longitudinal vertical planes of these vehicles, and not in simple vertical straight line sections.

For this, an annular chamber C is formed at the upper axial end of the sleeve which is defined inwardly by an axial extension 5 of the internal tubular frame 1, axially by respectively the elastomer body 3 and a rigid collar 6 extending the end of extension 5 radially outwardly, and externally by a resilient wall 7 resisting axial compression which is inserted axially between the edge of collar 6 and another collar 8 extending the corresponding end of the external tubular frame 2 outwardly.

The resilient wall 7 advantageously has a form substantially cylindrical of revolution, with at least one external stiffening washer 9 moulded integrally therewith.

There is further provided, in accordance with the invention, a "compensation" chamber, i.e. defined at least partially by a flexible membrane or "bellows" having very low deformation resistance, the annular chamber C is connected to this compensation chamber by a narrow channel and the whole formed by said channel and by the two chambers which it joins together is filled with liquid.

In the first embodiment illustrated in FIGS. 1 and 2, the compensation chamber is an annular chamber D provided at the lower axial end of the sleeve and defined internally by an axial extension 10 of the internal tubular frame 1, outwardly by an axial extension 11 of the external tubular frame 2 and axially by respectively the elastomer body 3 and by the flexible membrane or "bellows" 12 which is here annular and joins the two extensions 10 and 11 sealingly together.

The narrow channel provided for connecting the two annular chambers C and D together is here designated by the reference 13.

In the embodiment illustrated in the drawings, the narrow channel 13 is formed, like channel 4, by a longitudinal groove formed in the external cylindrical face of the above internal tubular section $1_1$, the two ends of this groove being connected to two apertures 14 formed radially in the external tubular section $1_2$ and opening respectively into the two chambers C and D.

With such a construction, the relative oscillations applied axially to one of the tubular frames 1 and 2 with respect to the other again result in driving liquid alternately through the narrow channel 13 and, for a predetermined value of the frequency of said oscillations, the liquid column contained in this channel is subject to a resonance effect which ensures efficient filtering of these oscillations.

This "axial" damping is here provided totally independently of the above described "radial" damping, which makes it possible to adjust each of these two behaviours accurately.

Furthermore, contrary to what is observed for the above radial oscillations oriented in direction Y and causing the two identical pockets A and B to come into play, the two annular chambers C and D do not play here exactly the same role.

Here, only chamber C really functions, each axial compression of its resilient wall 7 being followed by resilient axial expansion of this wall: chamber D, on the contrary, only passively absorbs, without resilient reaction, the excess liquid of variable volume which is driven towards it or is drawn from it through channel 13.

This behaviour, which is purely "compensation", of the annular chamber D makes it possible to adopt the following characteristic.

To increase the number of frequencies with respect to which damping of the device in direction Y is efficient, at least one additional narrow channel is provided connecting one at least of the two pockets A and B to the annular chamber D, and preferably two such channels 15, 16 assigned respectively to these two pockets.

This measure may be adopted without affecting the total independence between the two damping effects exerted respectively in the two directions X and Y because chamber D is a compensation chamber only passively absorbing the variable excess amounts of liquid which are fed to it without applying any resilient reaction on these excess amounts.

Here again, and as for the preceding channels 4 and 13, channels 15 and 16 are advantageously formed by grooves hollowed out in the internal tubular section $1_1$, which section is covered by facing portions of the internal cylindrical surface of the external tubular section $1_2$ and communicate with pockets A and B and chamber D through radial apertures formed in said external tubular section.

If it is desired to increase the frequencies of the oscillations with respect to which the sleeve is able to provide good damping in the axial direction, the number of narrow channels connecting the two annular chambers C and D together may also be increased, possibly by dividing one at least of these two chambers into at least two separate compartments connected respectively either to the other chamber, which is not sub-divided, or respectively to compartments themselves sub-divided of this other chamber.

Following which and whatever the embodiment adopted, a damping sleeve is finally obtained whose construction, operation and advantages (particularly the possibility of providing efficient "bidirectional" damping, i.e. in two directions X and Y perpendicular to each other) are sufficiently clear from the foregoing.

As is evident, and as it follows already from what has gone before, the invention is in no wise limited to those of its modes of application and embodiments which have been more especially discussed, it embraces, on the contrary, all variants thereof, particularly:

those in which the sleeve considered provides not only efficient "bidirectional" damping but also "tridirectional" or "universal" damping, i.e. in three directions X, Y and Z perpendicular to each other, and those in which the above "compensation" chamber is formed by one of the two diametrically opposite pockets of the sleeve.

The first of these two variants is illustrated in FIGS. 3 and 4.

In this variant, the two chambers A and B which are diametrically opposite in direction Y are replaced by four chambers A, B, E and F spaced apart evenly or not about axis X and diametrically opposite in twos, namely the two chambers A and B in direction Y and the two chambers C and D in direction Z, perpendicular to the two directions X and Y, and these chambers are connected diametrically in twos by means of narrow channels of the same type as the above channel 4, this channel 4 connecting together the two pockets A and B and another channels of the same type 17 connecting the two pockets E and F together.

Each of these four pockets A, B, E and F may be connected to the annular chamber D by a narrow channel of the same kind as the above channels 15 and 16, these channels being designated respectively by the references 18 and 19 in FIG. 4.

As can be seen in this figure, the different channels must of course not cross, which means providing for some of them detours for avoiding to other channels.

These detours may be used to give a relative great length to some of the channels in question, as is desirable for certain applications. With such a variant, efficient damping may be provided in all directions of space, for any direction may be broken down into its three components oriented respectively in the three directions X, Y and Z, and the multiplicity of the above described channels, associated with the purely "compensatory" nature of chamber D in which most of them open, make it possible to adapt the sleeve independently to the damping of several types of oscillations applied thereto in distinct directions.

The second of the two above mentioned variants is illustrated in FIGS. 5 and 6.

In this variant, the above pocket B is formed by a pocket B' defined outwardly by the external tubular frame 2 and inwardly by a flexible bellows 21 itself formed by a thin band curved both transversely to be humpbacked towards axis X and longitudinally in the form of a crescent substantially parallel to frame 2, this band defining a pocket 22 formed axially in the lower front face of the sleeve.

It is here into this pocket B' that the narrow channel 13' connected to the annular chamber C opens.

For adjusting the damping in the radial direction Y for two different oscillation frequencies, the pocket which is diametrically opposite pocket B' is further divided into two compartments, these two compartments being designated by the references $A'_1$ and $A'_2$ and being connected respectively to pocket B' by two narrow channels $4'_1$ and $4'_2$ of different dimensions.

The three channels 13', $4'_1$ and $4'_2$ have been represented schematically by arrows in FIGS. 5 and 6.

They are here formed close to the tubular frame 2, in a way known per se, each of these channels being formed by a groove in the outer face of a cylindrical socket housed jointingly inside the external tubular frame 2, this groove being covered by this frame and being connected at both its ends to appropriate apertures formed in the socket and opening into the pockets or chambers concerned.

The operation of the sleeve according to the present variant can be readily deduced from those described above with respect to the other variants.

It should be noted that here again the damping effects provided respectively in the two directions X and Y may be adjusted independently of each other, considering the "compensation" type which is adopted for pocket B' into which the whole of the narrow channels 13', $4'_1$ and $4'_2$ open.

We claim:

1. A hydraulic antivibratory sleeve comprising, on the one hand, two rigid tubular frames with an axis X, one surrounding the other, joined together by an intermediate elastomer body shaped so as to form therewith two sealed pockets diametrically opposite in a direction Y perpendicular to axis X and being work chambers defined by resilient working walls which provide substantial resistance to deformation, said sealed pockets communicating together through a narrow channel, the assembly formed by said pockets and said channel being filled with liquid and, on the other hand, at one of its axial ends, an annular work chamber defined respectively by extensions of the two tubular frames, by the intermediate elastomer body and by a resilient wall resisting axial compression and inserted axially between the said extensions, this annular work chamber being directly connected by a narrow channel only to a deformable chamber and the assembly formed by said annular work and deformable chambers and the channel which joins them together being filled with liquid, the deformable chamber being a compensation chamber defined partially by a flexible member which only opposes a negligible resistance to deformation, said deformable compensation chamber being separate from said sealed pocket working chambers, wherein (1) relative oscillations between the two tubular frames in the Y direction are damped essentially by the operation of the assembly formed by the sealed pockets, the said narrow channel connecting them and the liquid filling the pockets and their respective narrow channel and (2) relative oscillations between the two tubular frames in the X direction are damped essentially by the operation of the assembly formed by the annular work chamber, the deformable compensation chamber, the narrow channel connecting them and the liquid filling the annular work chamber, the deformable compensation chamber and their respective narrow channel.

2. A sleeve according to claim 1, wherein the compensation chamber is an annular chamber disposed at the other axial end of the sleeve and defined respectively by the intermediate elastomer body, by extensions of the two tubular frames and by the flexible member which is annular and connects the two extensions together.

3. A sleeve according to claim 1, wherein the pockets are four in number, distributed about the axis X and the diametrically opposite pockets are connected together in twos by narrow channels.

4. A sleeve according to claim 1, wherein one at least of the pockets is connected to the compensation chamber by a narrow channel.

5. A sleeve according to claim 1, wherein the internal tubular frame is formed by internal and external tube sections fitted jointingly one in the other and having juxtaposed cylindrical faces, and wherein the different narrow channels are formed by grooves hollowed out in one of the two juxtaposed cylindrical faces of the two tube sections, which grooves are connected at their ends to radial holes formed in the external tubular section.

6. A sleeve according to claim 5, wherein the tubular section in which the grooves are formed is the internal section.

* * * * *

UNITED STATES PATENT AND TRADEMARK OFFICE
CERTIFICATE OF CORRECTION

PATENT NO. : 5,172,893
DATED : December 22, 1992
INVENTOR(S) : BOUHIER, et al

It is certified that error appears in the above—identified patent and that said Letters Patent is hereby corrected as shown below:

On the title page, add the following, item [73] Assignee:
--HUTCHINSON, France--

Signed and Sealed this

Twenty-sixth Day of October, 1993

Attest:

BRUCE LEHMAN

*Attesting Officer*            *Commissioner of Patents and Trademarks*